United States Patent [19]

Blanchet

[11] Patent Number: 5,659,211

[45] Date of Patent: Aug. 19, 1997

[54] MOTORISED REDUCTION GEAR UNIT, IN PARTICULAR FOR DRIVING AT LEAST ONE MOTOR VEHICLE SCREEN WIPER, AND A METHOD OF ASSEMBLY OF A BRUSH CARRIER PLATE AND AT LEAST ONE ELECTRICAL COMPONENT IN SUCH A REDUCTION GEAR UNIT

[75] Inventor: Pierre Blanchet, Lencloitre, France

[73] Assignee: Valeo Systemes D'Essuyage, La Verriere, France

[21] Appl. No.: 634,835

[22] Filed: Apr. 19, 1996

[30] Foreign Application Priority Data

Apr. 21, 1995 [FR] France ................... 95 04798

[51] Int. Cl.$^6$ .................. H02K 15/00; H02K 11/00
[52] U.S. Cl. .................. 310/42; 310/68 R; 310/71;
310/75 R; 310/83; 310/239; 310/68 C
[58] Field of Search ................... 310/42, 238, 239,
310/242, 71, 68 C, 68 R, 83, 66, 67 R,
89, 75 R; 29/596

[56] References Cited

U.S. PATENT DOCUMENTS

| 4,292,555 | 9/1981 | Schaefer | 310/68 R |
|---|---|---|---|
| 4,293,789 | 10/1981 | King | 310/239 |
| 4,673,837 | 6/1987 | Gingerich et al. | 310/239 |
| 4,727,274 | 2/1988 | Adam et al. | 310/239 |
| 4,896,067 | 1/1990 | Walther | 310/239 |
| 5,006,747 | 4/1991 | Stewart | 310/239 |
| 5,041,751 | 8/1991 | Yokozuka | 310/239 |
| 5,066,878 | 11/1991 | Sekine et al. | 310/68 C |
| 5,148,073 | 9/1992 | Tamura | 310/239 |
| 5,194,769 | 3/1993 | Ade et al. | 310/51 |
| 5,196,750 | 3/1993 | Strobl | 310/239 |
| 5,221,130 | 6/1993 | Satoh et al. | 310/239 |
| 5,243,247 | 9/1993 | Schmidt | 310/72 |
| 5,453,649 | 9/1995 | Blanchet | 310/71 |

FOREIGN PATENT DOCUMENTS

| 2656171 | 6/1991 | France . |
|---|---|---|
| 4038317A1 | 11/1990 | Germany . |
| 91/03856 | 3/1991 | WIPO . |

OTHER PUBLICATIONS

French Search Report dated 9 Feb. 1996.

Primary Examiner—Thomas M. Dougherty
Assistant Examiner—Burt Mullins
Attorney, Agent, or Firm—Morgan & Finnegan, L.L.P.

[57] ABSTRACT

A motor vehicle screen wiper drive unit in the form of a motorised reduction gear unit has a body which is provided with a removable brush carrier plate, together with at least one electrical component connected to the brush carrier plate through a flexible electrical conductor, this component, or these components, being part of the power supply circuit for the drive unit. The brush carrier plate includes means for retaining the said component or components temporarily during fitting of the carrier plate in the body of the unit. The electrical component is arranged for sliding movement with respect to the carrier plate, into cooperation with retaining means formed in the body of the unit for retaining the component. A method of assembly of a brush carrier plate with at least one associated electrical component, in the body of such a drive unit, is also described.

4 Claims, 2 Drawing Sheets

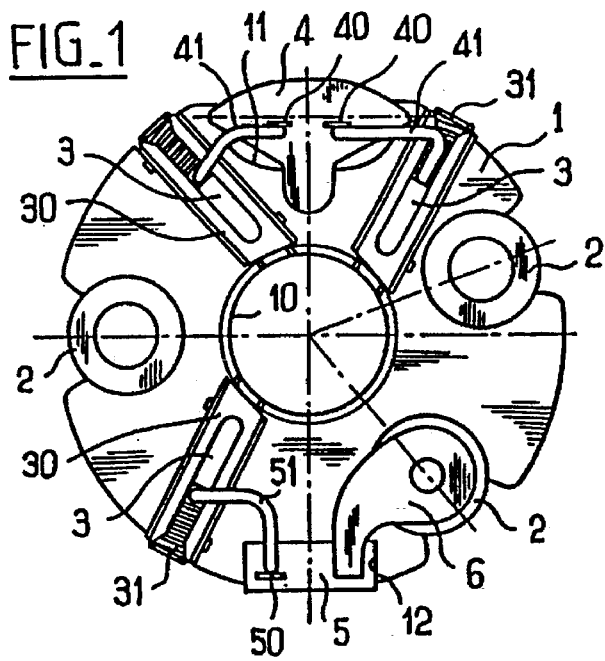
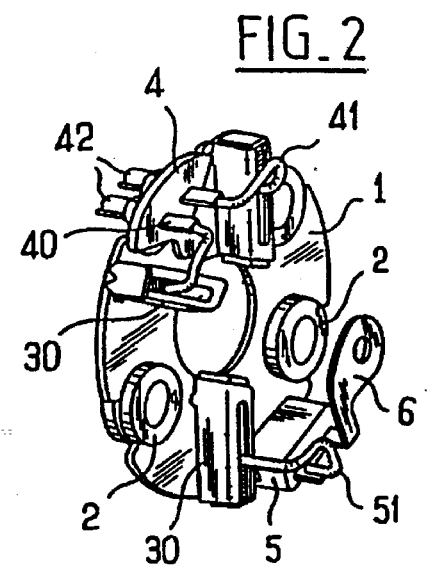
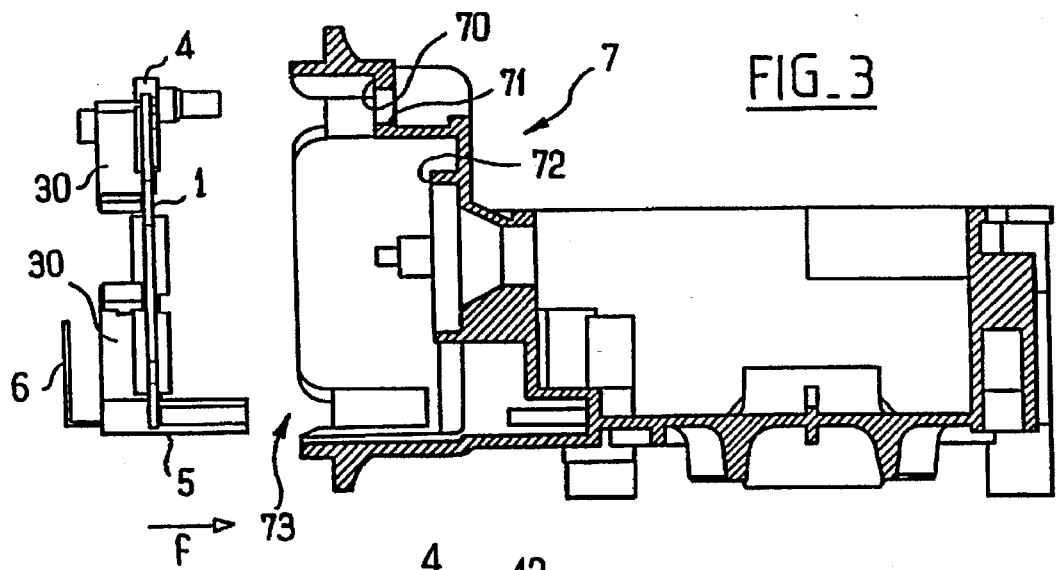
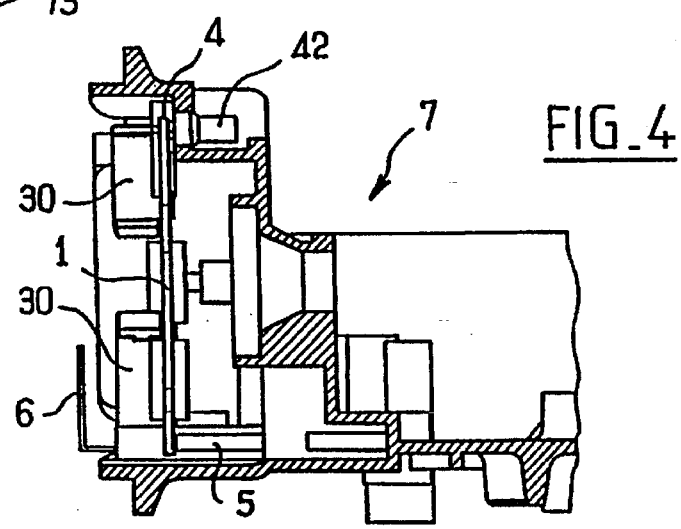

MOTORISED REDUCTION GEAR UNIT, IN PARTICULAR FOR DRIVING AT LEAST ONE MOTOR VEHICLE SCREEN WIPER, AND A METHOD OF ASSEMBLY OF A BRUSH CARRIER PLATE AND AT LEAST ONE ELECTRICAL COMPONENT IN SUCH A REDUCTION GEAR UNIT

FIELD OF THE INVENTION

The present invention relates to motorised reduction gear units, i.e. a drive unit comprising an electric motor driving an output shaft through reduction gearing, and in particular those which are designed for driving at least one screen wiper in a motor vehicle. The invention also relates to a method for assembly of a brush carrier plate, together with at least one electrical component, on the body of a motorised reduction gear unit.

BACKGROUND OF THE INVENTION

It is well known to equip the casings of electrical motorised reduction gear units, for driving windshield wipers for motor vehicles, with a brush carrier plate. Such a brush carrier plate is typically made of a plastics material, and has a circular central aperture through which the collector or commutator of the motor of the reduction gear unit passes. The carrier plate is generally equipped with two or three carbon brushes which are arranged in guides incorporated in the carrier plate.

The brush carrier plate also includes various electrical components which form part of the power supply circuit for the drive unit. Such a component consists for example of a connecting terminal for bringing the power supply into the drive unit, and/or a thermal protection component, that is to say a device which is arranged to interrupt the electrical supply to the drive unit in the event of overheating of the latter, In general, the brush carrier plate is mounted on the body of the drive unit, being engaged on suitable dampers. During operation of the motorised reduction gear or drive unit, the armature of the motor of the latter has a tendency to vibrate, and the carbon brushes which are in engagement with the commutator, carried by the rotor that constitutes the armature, transmit these vibrations to the carrier plate. Since the above mentioned electrical components are carried by the latter, this vibration is therefore transmitted to those components themselves. This gives rise to noises and to perturbations in the power supply circuit to the drive unit.

DISCUSSION OF THE INVENTION

An object of the present invention is to overcome the above mentioned problems, while facilitating the assembly of the brush carrier plate and associated electrical components in the body of the drive unit.

According to the invention in a first aspect, a motorised reduction gear unit, especially one adapted to serve as a drive unit for driving at least one screen wiper of a motor vehicle, having a body which is provided with a removable brush carrier plate and at least one electrical component connected to the carrier plate through a flexible electrical conductor, the said component being part of the power supply circuit for the drive unit, is characterised in that the said brush carrier plate includes means for temporarily retaining the said component during fitting of the carrier plate, the said component being adapted to slide with respect to the carrier plate in order to cooperate with retaining means for the said component which are provided on the body of the unit.

On completion of assembly, since the said electrical component is immobilised on the body of the unit within the retaining means formed in the body, it is no longer exposed to vibrations from the motor armature, end is therefore not in danger of causing noise or perturbations in the supply circuit for the drive unit.

In preferred embodiments of the invention, the motorised reduction gear unit has a connecting terminal constituting a said electrical component. In other embodiments it includes a thermal protection component by way of such an electrical component.

The, or at least one, said electrical component is preferably force-fitted in the body of the unit.

According to the invention in a second aspect, a method for fitting a brush carrier plate and at least one electrical component on the body of an electrical motorised reduction gear unit, in particular a drive unit for a motor vehicle screen wiper, in which the said component is part of the power supply circuit for the said unit, is characterised in that it includes the steps of:

(a) providing a brash carrier plate which includes retaining means for temporarily retaining the said component in position, the latter being connected to the said carrier plate through a flexible conductor and being adapted to slide with respect to the carrier plate; and (b) displacing the said carrier plate and electrical component in translational or straight line movement into engagement with respective abutment means through different distances, with an initial part of the translational movement being carried out on the carrier plate and said component in common.

In this way, a single common tool can be used to fit the brush carrier plate and its associated electrical component or components on the body of the drive unit, Such a method is easy for a robot to carry out.

Some preferred but optional features of the invention are as follows:

the path of the displacement of the said electrical component is shorter than that of the brush carrier plate;

especially in the above case, the said component consists of a connecting terminal;

the path of displacement of the said electrical component is greater than that of the carrier plate;

the electrical component may then consist of a thermal protection component; and a final phase of the displacement of the said electrical component fastens it into a retaining means formed in or carried by the body of the drive unit.

Further features and advantages of the present invention will appear more clearly on a reading of the following description of a preferred embodiment of the invention, which is given by way of non-limiting example only and with reference to the accompanying drawings.

BRIEF DESCRIPTION OF THE DRAWINGS

FIG. 1 is a front view of a brush carrier plate for a motorised reduction gear unit in accordance with the present invention, FIG. 2 is a perspective view of the brush carrier plate seen in FIG. 1.

FIGS. 3, 4, 5 and 6 are diagrammatic cross sectional views illustrating various stages in the method of assembly of the motorised reduction gear unit in accordance with the invention.

DESCRIPTION OF A PREFERRED EMBODIMENT OF THE INVENTION

Figure 5:
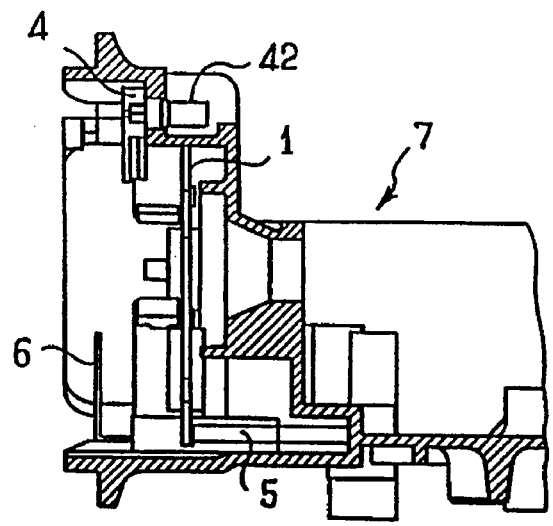
Figure 6:
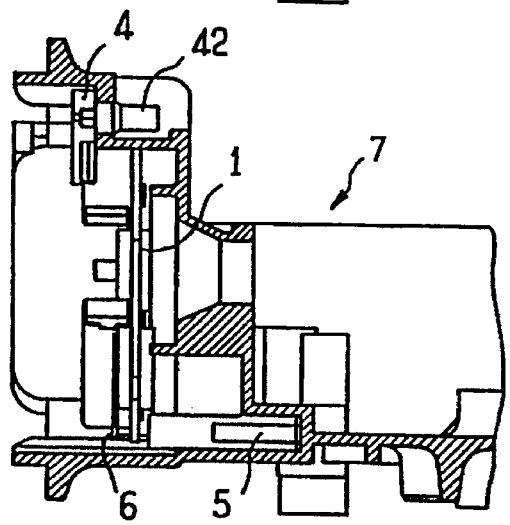

The brush carrier plate 1 shown in FIGS. 1 and 2 is made of a suitable plastics material, and has the general form of a thin disc. In a manner known per se, it is equipped with three damping pads 2, of generally cylindrical form and lying on either side of the general plane defined by the carrier plate. The purpose of these damping pads is to absorb the vibrations which can be set up in the commutator of the motor of the reduction gear unit, which extends through a circular central aperture 10 formed in the carrier plate 1.

Also in a manner known per se, the carrier plate 1 is provided with three brush carriers 30 which extend in generally radial directions. Carbon brushes 3 are mounted within the brush carriers 30 and are biassed radially inwardly by springs 31.

Between the two brush carriers 20 which are disposed in the upper part of the brush carrier plate 1, with reference to FIGS. 1 and 2, a wide notch 11 is formed in the material of the carrier plate. A connecting terminal 4 is fitted in this notch 11. The terminal 4 consists of a generally triangular plate which bears against the surface of the carrier plate 1. It includes, on its face disposed on the same side as the brush carriers 30, two metallic contacts 40 on which flexible electric conductors 41, connected to the brushes 3, are themselves connected. The terminal 4 includes connecting pads 42 on the opposite side of the connecting plate 4.

Diametrically opposed to the notch 11, the carrier plate 1 has a second notch 12, into which a thermal protection component 5 is force-fitted. The term "thermal protection component" means an electrical component which is adapted to cooperate with the motorised reduction gear unit and to cause it to stop in the event of overheating. The general shape of this thermal protection component is that of a parallelepiped which extends outwardly from the general plane of the carrier plate 1, and which carries a contact 50 connected to the third carbon brush 3 through a flexible conductor 51, together with a spade terminal 6 for connection to ground.

The two notches 11 end 12 constitute means for holding temporarily in position the members 4 and 5 which are part of the power supply circuit for the motorised reduction gear unit. An important feature of the present invention is that these temporary retaining means are such that the members 4 and 5 are able to slide with respect to the carrier plate 1 in order to be incorporated permanently into the motorised reduction gear unit. This feature will be explained during the remainder of the present description.

Referring now to FIGS. 3 to 6, these show in longitudinal cross section a part of the body 7 of the motorised reduction gear unit, on which the brush carrier plate 1 is arranged to be fitted. The body 7 includes means on or in which the brush carrier plate, the connecting terminal 4, and the thermal protection protection component 5, are adapted to be fitted respectively. In particular, the body 7 has an aperture 71, within which the connecting pads 42 of the connecting terminal 4 are arranged to be fitted. The brush carrier plate 1 is itself arranged to be positioned against a cylindrical shoulder 72 which surrounds the commutator of the motor of the reduction gear unit. Finally, the thermal protection component 5 is adapted to be fitted in place in a housing formed within the body 7.

As can be seen in the drawings, the connecting terminal 4, the brush carrier plate 1 and the thermal protection component 5 are arranged to be positioned on the body 7 in separate emplacements, each of which is located at a different distance from the access aperture 73 of the body 7. The method of assembly of the reduction gear unit starts with the provision of the brush carrier plate 1 as described above with reference to FIGS. 1 and 2. A further step in the method consists in displacing the carrier plate 1, carrying the connecting terminal 4 and the thermal protection component 5, in a straight line towards the body 7 of the reduction gear unit, as shown in FIGS. 3 to 6. FIG. 3 shows an initial stage in which the carrier plate 1 is brought into facing relationship with the body 7.

In a second step, the carrier plate 1 is brought towards the body 7 as indicated by the arrow f, until the plate constituting the connecting terminal 4 comes into engagement against the integral portion 70 of the body indicated in FIG. 3. This portion 70 constitutes an end stop for the connecting terminal 4. The situation is then as shown in FIG. 4, in which the connecting terminal 4 has been fitted in position.

Figure 7:
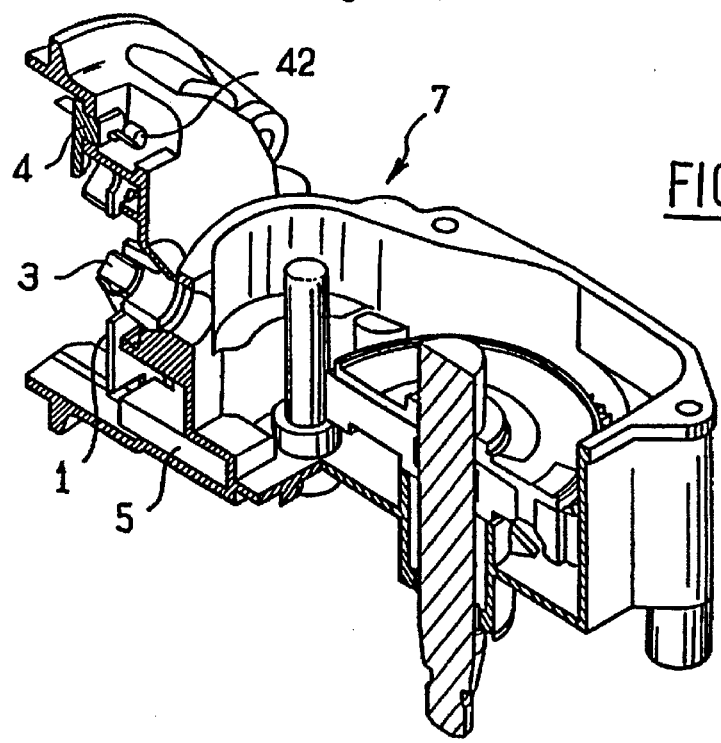
FIG. 7 is a partial perspective view of the body of the motorised reduction gear unit which is to be equipped with a brush carrier plate and associated electrical components in accordance with the invention.

In a third step, the sliding movement of the carrier plate 1 and the thermal protection component 5 towards the body 7 is continued until the carrier plate 1 comes into abutment against the cylindrical shoulder, or crown, 72 of the body. The situation is then as shown in FIG. 5. This position having been reached, the thermal protection component 5 is then made to slide into its housing formed in the body 7, this being achieved for example with the aid of a narrow tool which can push the latter into place. The position shown in FIGS. 6 and 7 has now been reached.

As may be noted, the path of the translational or straight line movement of the connecting terminal 4 is shorter than that of the carrier plate 1, while the path of the straight line movement of the thermal protection component 5 is longer than that of the carrier plate 1.

In this way, the brush carrier prate 1 and various electrical components are assembled on to the body 7, all in the same movement of sit of the elements concerned. Such a manoeuvre is very suitable to be performed by a robot, which enables the brush carrier plate 1 and electrical components such as 4 and 5 to be fitted very much more quickly.

In addition, at the end of the assembly process, the electrical components are disposed in housings in the body of the motorised reduction gear unit, and are therefore not exposed to vibrations from the armature when the motor is in operation, The invention is of course applicable to the fitting of a brush carrier plate equipped with any kind of electrical or electronic components associated with the motorised reduction gear unit.

What is claimed is:

1. An electrical motorised reduction gear unit comprising: a body; a removable brush carrier plate carried by the body; carbon brushes carried by the carrier plate; at least one electrical component, adapted to form part of a power supply circuit for the motorised reduction gear unit; and flexible electrical conductor means connecting said electrical component to the brush carrier plate, wherein the said body defines first retaining means for retaining the said at least one electrical component in position, and the brush carrier plate defines second retaining means, for the temporary retention of said electrical component during fitting of the carrier plate in the body, the said second retaining means being adapted for sliding movement of the associated said electrical component with respect to the carrier plate and into cooperation with the said first retaining means.

2. A unit according to claim 1, wherein a said electrical component is a connecting terminal.

3. A unit according to claim 1, wherein a said electrical component is a thermal protection component.

4. A unit according to claim 1, wherein at least one said electrical component is force-fitted on the body.

* * * * *